May 18, 1926.

H. W. PRICE 1,585,413

PROCESS AND APPARATUS FOR GRADING MATERIALS

Filed May 21, 1924    2 Sheets-Sheet 1

May 18, 1926.

H. W. PRICE 1,585,413

PROCESS AND APPARATUS FOR GRADING MATERIALS

Filed May 21, 1924    2 Sheets-Sheet 2

INVENTOR
Howard W. Price
By Daly, Macklin, Goldrick & Teare
ATTORNEYS

Patented May 18, 1926.

1,585,413

UNITED STATES PATENT OFFICE.

HOWARD W. PRICE, OF SWARTZ, LOUISIANA, ASSIGNOR TO J. M. HUBER CO. OF LOUISIANA, INC., OF SWARTZ, LOUISIANA, A CORPORATION OF LOUISIANA.

PROCESS AND APPARATUS FOR GRADING MATERIALS.

Application filed May 21, 1924. Serial No. 714,764.

In the manufacture of carbon black, the carbon is formed by impinging a hydrocarbon flame upon a chilling surface or plate on which the carbon condenses and from which it is gathered. Different grades of carbon are formed in this manner and the physical characteristics of the carbon are determined to a great extent by the temperature ranges under which the carbon is formed. When forming carbon black under such conditions, there is usually a small percentage of amorphous carbon formed, which is relatively hard and somewhat abrasive and would, therefore depreciate the value of the carbon black if not removed in some manner. Inasmuch as this undesirable form of carbon becomes thoroughly commingled with the carbon black, it has heretofore been quite difficult and consequently expensive to remove it.

The general object of the present invention therefore, is the provision of a novel method of refining the carbon black, after it has been collected from the gathering or chilling plate, to remove the abrasive and lump portions of the carbon.

Another object of my invention is the provision of a novel method of refining carbon black wherein the product may be subjected to an air flotation gradation.

A further object of my invention is the provision of an apparatus in the nature of a novel bolting machine adapted to carry out the foregoing objects in a highly efficient and simplified manner.

Other objects of my invention will be hereinafter set forth in the following description of the apparatus illustrated in the accompanying drawings and which is adapted to the carrying out of my novel method of grading and refining carbon black. The essential characteristics of my invention are summarized in the claims.

Figure 1:
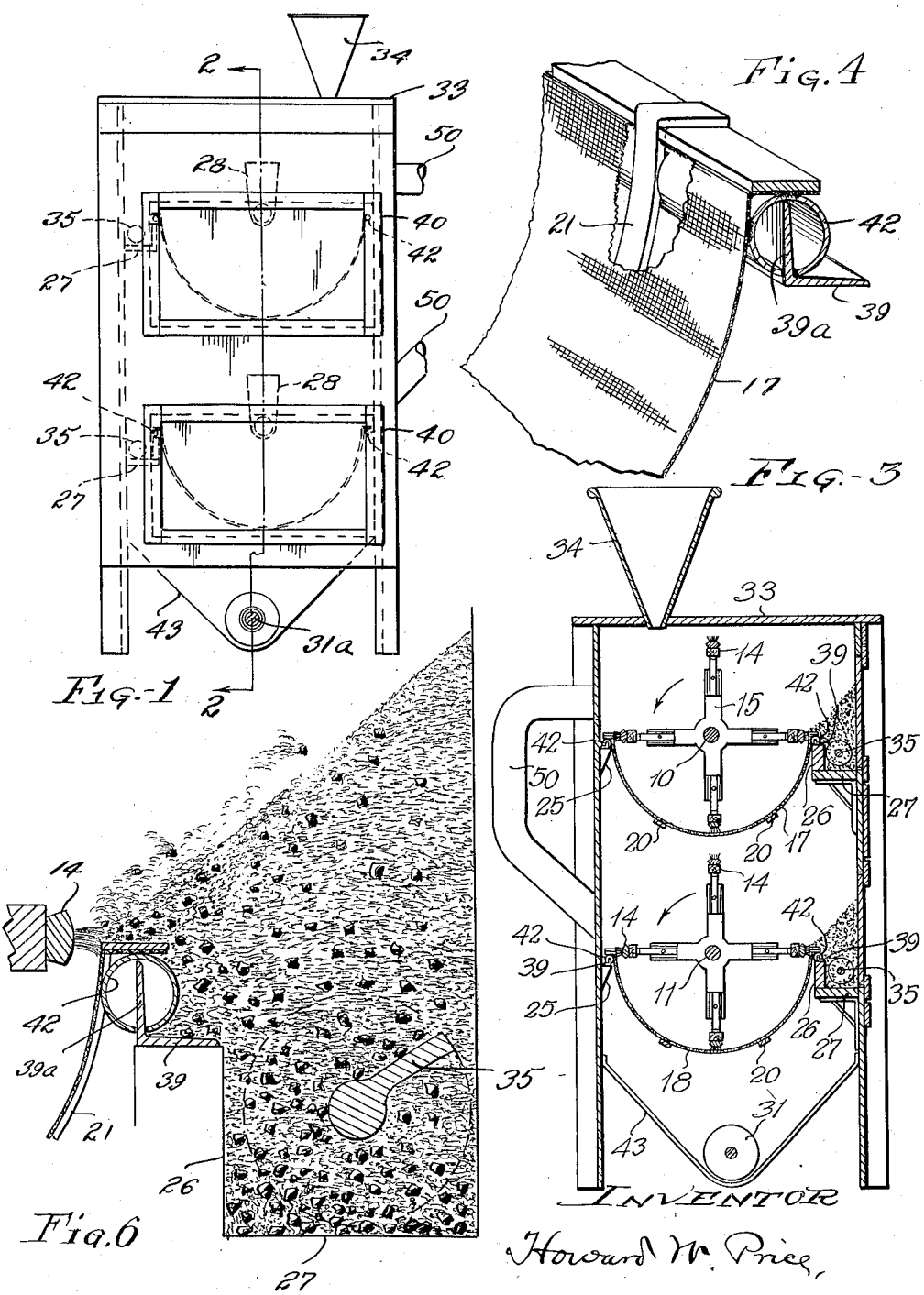
Figure 2:
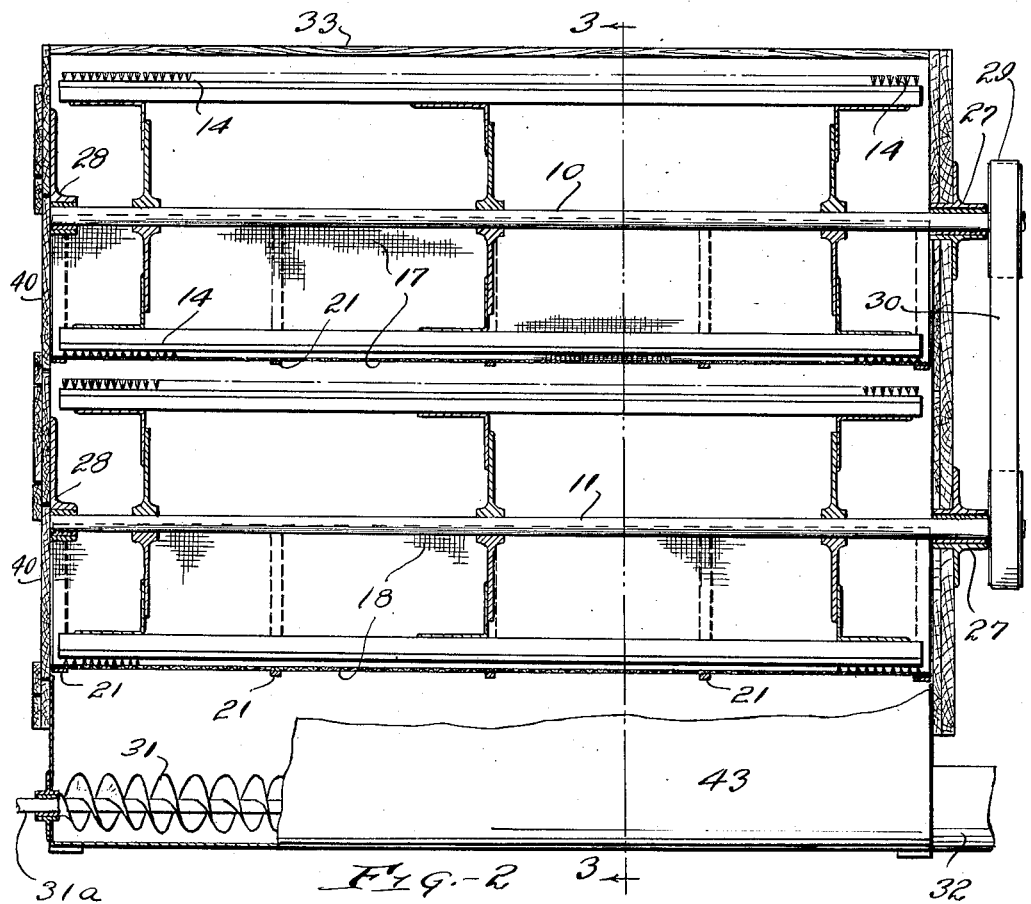
Figure 5:
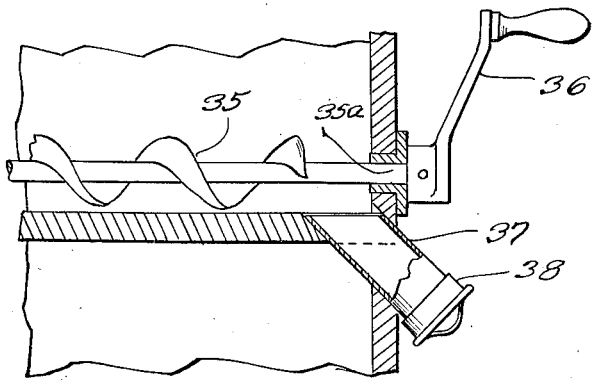

In the drawings, Fig. 1 is an end elevation of a bolting machine constructed in accordance with the objects of my invention; Fig. 2 is an enlarged cross-sectional elevation taken substantially along the lines 2—2 of Fig. 1; Fig. 3 is an enlarged transverse section taken substantially along the lines 3—3 of Fig. 2 and Fig. 4 is a fragmentary perspective view showing in detail the manner of removably supporting screening troughs used in the bolting machines; Fig. 5 is a fragmentary detail illustrating the manner of removing the lump carbon and foreign matter separated by the machine; Fig. 6 is an enlarged view illustrating my method of trapping the particles of lump carbon and foreign matter whereby they become separated and are prevented from passing through the bolting machine by repeated action of the carbon black agitating means.

Carbon black is commercially produced by effecting the incomplete combustion of a hydro-carbon gas, usually a natural gas. The natural gas is burned with a smoky flame and is impinged against a metallic chilling surface, whereupon the carbon condenses upon the surface and the black thus formed is subsequently collected from it. While such a process produces a carbon black, which is comparatively free from grit, scale and oil, nevertheless a small amount of scale, cindered carbon and lumpy foreign matter is usually present and this small percentage of impurity in the carbon black when ground into a varnish or ink, materially affects the covering power of the black due to the abrasive characteristics of the impurity.

My method contemplates the isolation of the impurities which are usually of a greater density than the carbon black by gravitation and to bring this about I violently agitate the mass to obtain an air flotation of a considerable portion of the carbon black, whereupon the impurities become sufficiently isolated to be deposited upon a trapping medium in the nature of an unagitated bed of the carbon black.

It should be borne in mind in reading the following description that my method of refining or grading carbon black is also applicable to the grading of other forms of highly powdered material such as pigments and cement.

In the drawings I show an apparatus which has proven to be quite efficient in carrying out the steps of my method of refining and grading the carbon black and this apparatus is in the nature of a bolting machine which will now be described.

In Figs. 2 and 3, I disclose a machine construction which may comprise an upper screening device and a lower screening device, both positively driven and mounted upon a frame which is completely inclosed by a suitable air tight housing from which the screened carbon and impurities may be readily removed without interfering with the continuous operation of the machine.

The lower part of the machine housing comprises a hopper provided with a screw conveyor for continuously removing the carbon while the top of the housing is provided with a chute for continuously feeding the material to the machine.

The screening devices may comprise an upper shaft 10, a lower shaft 11, rotatable brushes 14 extending longitudinally substantially the length of the machine and spiders 15 upon which the brushes 14 are radially adjustable whereby the bristle tips of the brushes may be in slight rubbing contact with the inner surfaces of semi-circular trough shaped screens 17 and 18. For grading carbon black to be used in ink, the upper trough screen 17 is preferably formed of a thirty mesh screen, while the lower trough screen 18 may be formed of a fifty mesh screen. The upper screening device serves to remove the coarser impurities from the carbon black while the lower screening device serves to remove the finer impurities passed by the upper screening device. It will be understood, of course, that any number of screening devices may be associated in the manner disclosed to carry out a still further refining of the carbon black as desired.

The trough screens 17 and 18 are arranged to be withdrawn from the housing and may be suitably reinforced with longitudinally extending iron straps 20 and circumferentially extending bands 21 whereby the troughs may be suspended between and supported by brackets 25 and 26 suitably attached to the longitudinal walls of the machine. These trough screens are slidably supported upon the brackets 25 and 26 whereby they may be shifted endwise and pass through door ways formed in an end wall of the machine as will be hereinafter described.

The carbon agitating and wiping means comprising the shafts 10 and 11, brushes supported thereby are suspended upon bearing members 27 and 28 suitably mounted upon the end walls of the machine and carry exteriorly disposed pulleys 29 which are driven by a belt 30. The pulleys 29 may be of different diameters if desired, to rotate the upper brushes 14 at a different speed than the lower brushes 14 and the machine may be driven by a source of power, not shown, acting on either the upper or lower shafts 10 and 11 respectively.

The bottom of the machine comprises a hopper 43 provided with a screw conveyor 31 at its lower extremity whereby the carbon black as it passes through the lower screen 18 may be conveyed longitudinally of the hopper and outwardly through a conveyor tube 32. This conveyor tube 32 may be rotated by power applied to an extension 31ª thereof projecting exteriorly of the hopper. The top 33 of the machine is provided with a longitudinal aperture whereby the ungraded material may be passed into the machine through a funnel 34 associated with the aperture.

The means for carrying out the steps in my method of isolating the impurities from carbon black will now be described.

As shown in Fig. 3 I provide troughs formed by the members 26 and 27 to extend longitudinally of the screen troughs 17 and 18 along the right marginal edges thereof. Disposed within the troughs are screw conveyors 35 which are normally inoperative, but as shown in Fig. 5 may be manually rotated by a crank 36 attached to an extension 35ª of the conveyors. The shafts of these conveyors may be suitably mounted in the end walls of the machine and when operated the conveyors serve to remove the contents of the trough through openings 37 formed in one end wall of the machine. The openings 37 may comprise small chutes normally closed by cap members 38.

To prevent th escape of lumpy coagulated portions of carbon black or foreign matter from the top screening device to the lower device without its having passed through the screen 17 as well as to facilitate the ready removal of the screen 17 from the machine, I mount the trough 17 upon longitudinally extending angle bars or rods 39. One rail is mounted upon the bracket members 25 while the other rail is mounted upon the members 26 forming the side or refuse troughs. Upwardly extending legs 39ª of these angle arms afford slideways for split tubular members 42 soldered or otherwise suitably attached to the side edges of the trough screens 17 and 18. As shown in Fig. 4 this construction affords an effective seal between the upper portion of the machine and the intermediate portion thereof as well as an efficient slide bearing and support for the trough screens. One end wall of the machine is provided with removable doors 40 whereby the screen troughs 17 and 18 may be removed therefrom in the event it is desired to clean the screening thereof or to change the screening to obtain a different mesh. It will be noted in Fig. 2 that the ends of the trough members are mounted within the machine about the end walls of the machine whereby the escape of material from the trough to the bottom hopper of the machine is prevented. The operation of the machine is as follows:

The brushes 14 are driven in the direction of the arrows as shown in Fig. 3. The ungraded carbon black enters the machine through the funnel 34 and rotation of the brushes in the upper screening device agitates the material to such an extent that a considerable portion thereof becomes suspended in the air. A certain percentage, however, of the material will be brushed or wiped over the surface of the screening trough 17 and so much of it which does not pass through the meshes of the screen will be thrown upwardly and be deposited in the side troughs containing the screw conveyors 35. Thus the shelf becomes rapidly filled with a mixture of carbon black, hard particles of carbon, etc., and the continuous operation of the machine results in the material being deposited in these side troughs until the angle of repose thereof has been formed, whereupon surplus material will have a tendency to fall back into the screen trough and will be subjected to further agitation by the rotating brushes. This condition is illustrated in the enlarged cross-sectional view in Fig. 6. It should be here stated, that the heavier impurities will not flow toward the screen trough but will become buried in the carbon black supported by the refuse trough and which is not being agitated and eventually settles to the bottom of the refuse trough, whereupon it may be removed by operation of the screw conveyors 35.

As shown in Fig. 3, a passageway extending between the top of the machine and the intermediate portion thereof above the bottom screening device is provided, which may comprise a series of U-shaped tubes 50 through which the air flotated carbon may pass from the top of the machine downwardly to the bottom screening device. The bottom legs of these U-tubes are preferably inclined whereby the carbon which settles therein may flow downwardly by gravity into the bottom trough 18.

The action of the bottom screening device is substantially the same as the action hereinbefore described, the bottom screen, however, due to its finer mesh serves to stop whatever fine grit which may have passed through the upper screen trough. These impurities, will of course be impinged upon the carbon black bed supported by the bottom refuse trough.

From the foregoing description of my invention it will be seen that I provide a very simple method of entrapping impurities such as hard pellets of carbon in a softer bed of carbon black not being agitated and that the actual separation is effected by the settling of the hard particles of carbon, which are of greater density than the carbon black, to the bottom of the refuse troughs disposed at the sides of screening troughs, whereupon it may be removed from time to time by the operation of small screw conveyors 35 without necessitating a cessation in the operation of the machine. Furthermore the successful operation of my method is to be found in the fact that the novel apparatus herein described does not subject the hard pellets or lumps of carbon to continuous agitation but after one or two passes over the screening surface they become entrapped by an unagitated bed of the carbon black. This important feature prevents the hard, gritty matter from being ground through the screens.

I claim:

1. The method of refining carbon black which includes the steps of agitating the material to cause a portion thereof to be air-floated and other portions thereof to be simultaneously passed through a screen while at the same time removing the undesirable portions or particles by impinging them upon a bed of the unagitated material by the same action which causes the air flotation of the material.

2. The method of refining carbon black which includes the steps of agitating a mass of the material to obtain a partial air flotation thereof and rubbing a non-floating portion of the mass comprising the more dense material through a screen.

3. The method of refining carbon black which includes the steps of agitating a mass of material to obtain a partial air flotation thereof, rubbing a more dense mass of the material to cause it to pass through a screen and depositing the non-floating and non-passable portion of the mass comprised of heavier particles upon an unagitated bed of carbon black, whereby the heavier particles are submerged therein.

4. The method of grading a powdered mass of material, of such granular consistency as to be air floated, which comprises mechanically agitating a mass of the material to cause the finer grain portions thereof to be air suspended, exerting a force upon the non-floating portion of the mass to cause a disassociation of clusters thereof by rubbing the same upon a screen and impinging the heavier non-floating and non-disintegrating particles upon a bed of the material which is not being agitated, whereby the heavier particles will be removed from further agitation.

5. The method of refining carbon black which includes the steps of agitating the material to cause a portion thereof to be air-floated and other portions thereof to be simultaneously passed through a screen while at the same time removing the undesirable portions or particles by impelling them out of the path of the agitated material by the same action which causes the air flotation of the material.

6. The method of grading a powdered mass of material, of such granular consistency that the greater portion thereof may be air floated, which comprises mechanically agitating a mass of the material to cause the finer grain portions thereof to be air suspended, brushing the non-floating mass over a screen and impinging the unscreened particles upon a bed of the material which is not being agitated.

7. In a bolting machine for refining carbon black the combination of a rotating element provided with a plurality of angularly spaced brushes set at a common radius, a semi-cylindrical screen with which said brushes contact during a part of the rotation thereof, a second group of cooperating elements, including brushes and a screen coordinated in the manner above set forth and disposed there below and means disposed adjacent the path of rotation of the brushes for receiving and retaining the coarser grained material which fails to pass through the screens.

8. In a bolting machine the combination of a plurality of carbon black agitating means for air-floating part of the carbon, a grading screen associated with each of said plurality of means, the association of said means being such that the carbon black when graded by one means is passed to another, refuse receiving means disposed adjacent to said foregoing means for receiving the heavier impassable material which fails to pass through the screen, other means for removing said material and an enclosed structure completely housing all of said foregoing means.

9. In a bolting machine of the character described the combination of a plurality of rotating carbon wiping means, a screen with which the wiping means contact during rotation thereof, a second set of rotating wiping means, disposed beneath the first, a cooperating screen therefor, means disposed adjacent each screen for receiving and removing the material which fails to pass through the respective screens, a housing enclosing all of said means and means disposed adjacent the bottom of the housing for removing the screened carbon without opening the housing.

10. In a carbon bolting machine the combination of a housing, a trough-shaped screen disposed within the housing, a mechanically actuated means for wiping carbon black over said screen, means for supporting the screen trough within the housing in juxtaposition to said actuated means comprising a rail mounted on and supported by the wall of the housing and means secured to the longitudinal edges of said trough-shaped screen for slidably engaging said rail, said housing having a doorway formed in an end wall thereof disposed adjacent the end of the trough screen whereby the trough screen may be removed from the machine by sliding it along said rail.

11. In a bolting machine of the character described, the combination of a plurality of trough-shaped screens, one disposed above another, whereby material passing through one screen may drop through to the other, means associated with the respective screens for wiping the carbon black over the surfaces of the screens, to cause the same to pass therethrough, a compartment associated with each screen comprising a trough extending longitudinally of the screen whereby material which fails to pass through the screen after being wiped thereover, may be deposited in said trough, and screw conveyors disposed in the troughs for removing said rejected material without interrupting the continuous operation of the machine.

12. In a carbon bolting machine, the combination of a housing, a trough-shaped screen disposed within the housing, mechanically actuated means for wiping carbon black over said screen and means for supporting the screen trough within the housing comprising a rail mounted on and supported by the walls of the housing and means secured to the longitudinal edges of said trough-shaped screen for slidably engaging said rail.

13. In a carbon bolting machine, the combination of a housing, a trough-shaped screen disposed within the housing, means for wiping carbon black over said screen and means for slidably supporting the screen trough within the housing comprising rails mounted on and supported by the walls of the housing and means secured to the longitudinal edges of said trough-shaped screen for slidably engaging said rails, said means engaging the rails to prevent the passage of carbon around the longitudinal edges of the screen.

14. In a bolting machine the combination of a plurality of trough-shaped screens, one disposed above another, whereby material passing through one screen may drop through to the other, means associated with the respective screens for brushing the carbon black over the surface of the screen, a refuse receiving trough extending longitudinally of the screen whereby material which fails to pass through the screen after being wiped thereover, may be deposited in said trough, and means for removing the rejected material longitudinally of the trough.

15. In a bolting machine for refining carbon black the combination of a housing divided into grading compartments, partitioning means within the housing, comprising screens, the bottom of the housing comprising a hopper, a conveyor in the bottom of the housing for removing the graded material after having passed through said screens, an upper and a lower rotating shaft, a plurality of carbon wiping means mounted on the shaft and adapted to cooperate with the respective screens to wipe the carbon thereover and cause the same to pass through the screens and to agitate the finer grained carbon to cause an air flotation thereof and means establishing communication between the top of the housing and an intermediate compartment therein formed by said screens for permitting that portion of the carbon which has been air floated in the top of the housing to pass to the lower screen.

16. In a machine of the character described, a grading screen comprising a semi-cylindrical member, screen supporting means in the nature of slideways and slide members comprising tubular members forming a connecting means between the screen and the slideways and comprising a baffle connection between the housing of the machine and the screen for preventing the passage of carbon other than through the screen.

17. In a machine of the character described, a grading screen comprising a trough shaped member, screen supporting means comprising angle bars and slide members comprising tubular members forming a a connecting means between the screen and the bars and forming a baffle connection between the housing of the machine and the screen for preventing the passage of carbon other than through the screen.

18. In a machine of the character described, a grading screen, screen supporting means in the nature of slideways and slide members mounted on the screen and forming a connecting means between the screen and the slideways and comprising a baffle connection between the housing of the machine and the screen for preventing the leakage of carbon.

19. In a bolting machine for refining carbon black the combination of a housing divided into grading compartments, by screens comprising a partitioning means within the housing, an upper and a lower rotating shaft, a plurality of carbon wiping brushes adjustably mounted on the shaft and adapted to cooperate with the respective screens to wipe the carbon thereover and cause the same to pass through the screens and to agitate the finer grained carbon to cause an air flotation thereof, said housing being provided with passageways establishing communication between the top of the housing and an intermediate compartment therein formed by said screens for permitting that portion of the carbon which has been air floated in the top of the housing to pass to the lower screen.

In testimony whereof, I hereunto affix my signature.

HOWARD W. PRICE.